US010795211B2

(12) United States Patent
Sonoda et al.

(10) Patent No.: US 10,795,211 B2
(45) Date of Patent: Oct. 6, 2020

(54) LIQUID CRYSTAL DISPLAY DEVICE

(71) Applicant: Japan Display Inc., Minato-ku (JP)

(72) Inventors: Hidehiro Sonoda, Tokyo (JP);
Takenori Hirota, Tokyo (JP); Noboru Kunimatsu, Tokyo (JP); Koichi Igeta, Tokyo (JP)

(73) Assignee: Japan Display Inc., Minato-ku (JP)

( * ) Notice: Subject to any disclaimer, the term of this patent is extended or adjusted under 35 U.S.C. 154(b) by 240 days.

(21) Appl. No.: 15/949,336

(22) Filed: Apr. 10, 2018

(65) Prior Publication Data

US 2018/0314113 A1 Nov. 1, 2018

(30) Foreign Application Priority Data

Apr. 28, 2017 (JP) ................................ 2017-090099

(51) Int. Cl.
*G02F 1/1337* (2006.01)
*G02F 1/1345* (2006.01)
*G02F 1/1339* (2006.01)
*G02F 1/1333* (2006.01)
*G02F 1/1362* (2006.01)
(Continued)

(52) U.S. Cl.
CPC ...... *G02F 1/133723* (2013.01); *G02F 1/1339* (2013.01); *G02F 1/1345* (2013.01); *G02F 1/13452* (2013.01); *G02F 1/133345* (2013.01); *G02F 1/136286* (2013.01); *G02F 1/1368* (2013.01); *G02F 1/133788* (2013.01); *G02F 2001/13629* (2013.01); *G02F 2001/133368* (2013.01); *G02F 2001/134345* (2013.01); *G02F 2201/501* (2013.01)

(58) Field of Classification Search
None
See application file for complete search history.

(56) References Cited

U.S. PATENT DOCUMENTS 5,317,434 A * 5/1994 Ohara .................... G02F 1/1337
349/106
5,828,435 A * 10/1998 Kato ...................... G02F 1/1339
349/190
(Continued)

FOREIGN PATENT DOCUMENTS

JP 05-019265 1/1993
JP 3067314 7/2000
(Continued)

*Primary Examiner* — Edward J Glick
*Assistant Examiner* — David Y Chung
(74) *Attorney, Agent, or Firm* — Oblon, McClelland, Maier & Neustadt, L.L.P.

(57) ABSTRACT

According to one embodiment, a liquid crystal display device includes a first substrate including a first area and a second area, a second substrate opposing the first substrate but not opposing the second area, a sealing part which adheres the first substrate and the second substrate to each other, a liquid crystal layer located between the first substrate and the second substrate and surrounded by the sealing part, an alignment film disposed on the first substrate so as to be in contact with the liquid crystal layer and a terminal located in the second area and connected to an external circuit. In plan view, the alignment film includes an end located between the sealing part and the terminal.

12 Claims, 6 Drawing Sheets

(51) Int. Cl.
     *G02F 1/1343*     (2006.01)
     *G02F 1/1368*     (2006.01)

(56) References Cited

U.S. PATENT DOCUMENTS

| | | | | |
|---|---|---|---|---|
| 6,646,708 | B1* | 11/2003 | Muramatsu | G02F 1/13452 349/149 |
| 6,741,315 | B1* | 5/2004 | Uchiyama | G02F 1/1345 349/149 |
| 2009/0027591 | A1* | 1/2009 | Hwang | G02B 5/0226 349/64 |
| 2011/0199565 | A1* | 8/2011 | Kunimatsu | G02F 1/133723 349/123 |
| 2016/0161815 | A1* | 6/2016 | Ishige | G02F 1/13452 349/46 |
| 2016/0300863 | A1 | 10/2016 | Koide et al. | |
| 2017/0069666 | A1 | 3/2017 | Koide et al. | |

FOREIGN PATENT DOCUMENTS

| | | |
|---|---|---|
| JP | 2000-273172 | 10/2000 |
| JP | 3299893 | 7/2002 |
| JP | 2016-200659 | 12/2016 |

\* cited by examiner

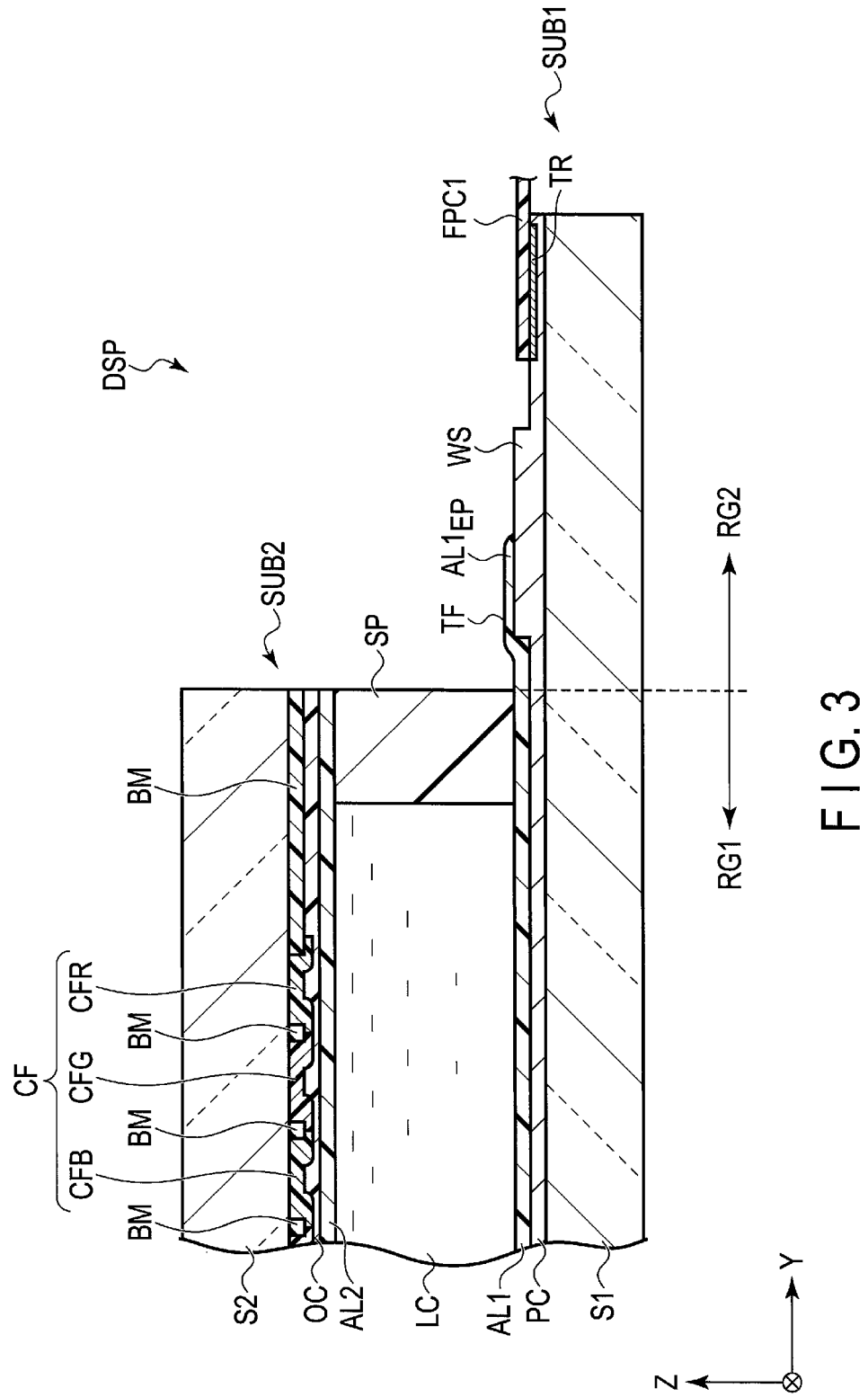
F I G. 3

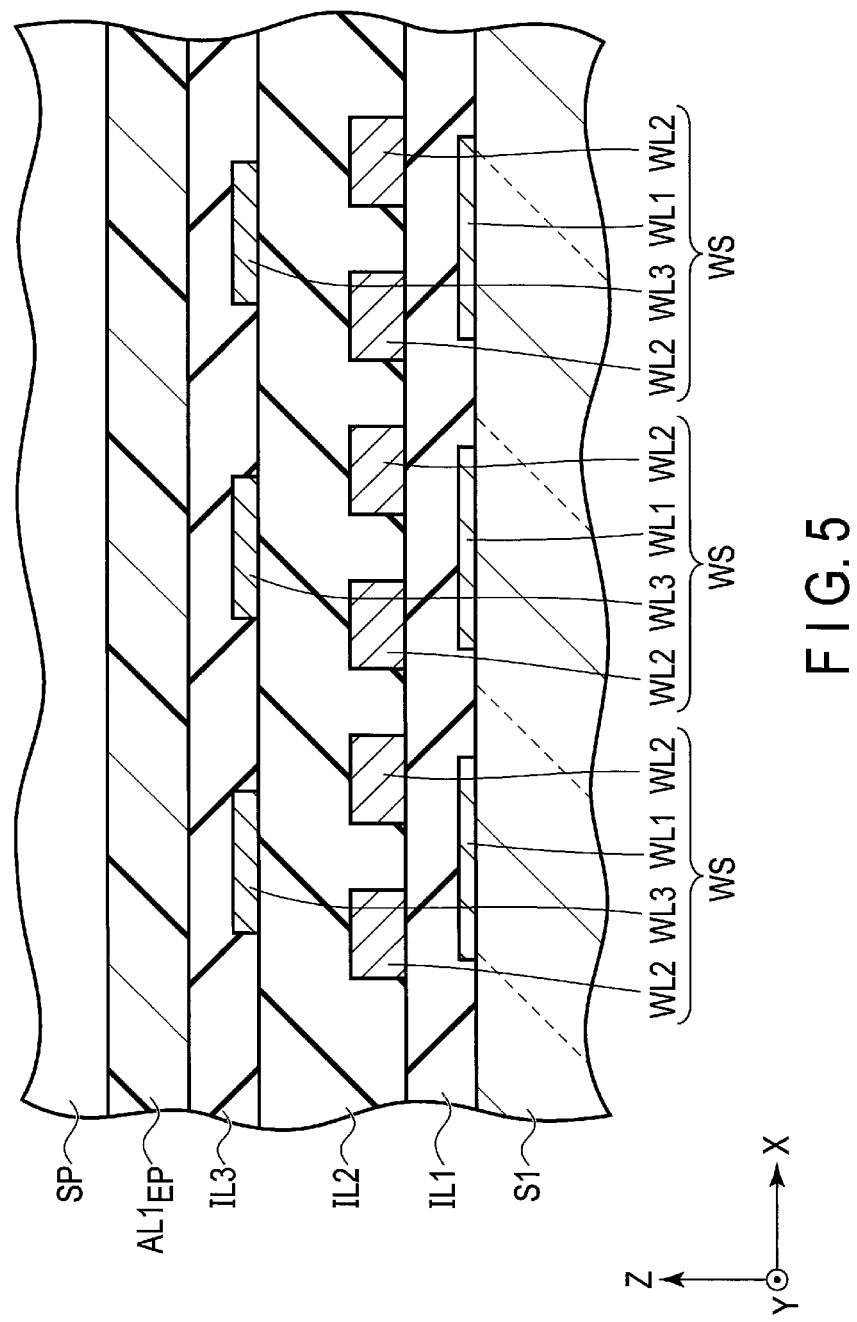
F I G. 5

LIQUID CRYSTAL DISPLAY DEVICE

CROSS-REFERENCE TO RELATED APPLICATIONS

This application is based upon and claims the benefit of priority from Japanese Patent Application No. 2017-090099, filed Apr. 28, 2017, the entire contents of which are incorporated herein by reference.

FIELD

Embodiments described herein relate generally to a liquid crystal display device.

BACKGROUND

Liquid crystal display devices comprise two substrates (the first substrate and second substrate) disposed to oppose each other. The first substrate includes a first area and a second area. The second substrate opposes the first area of the first substrate, but does not oppose the second area of the first substrate. More specifically, the second area of the first substrate extends to an outer side of an edge of the second substrate. In the first area of the first substrate, a thin film transistor (TFT) and the like are provided. In the second substrate, a color filter, a light-shielding film and the like are provided. In the second area of the first substrate, a terminal is provided, to which an external circuit or the like is connected.

The first substrate and the second substrate define a predetermined cell gap therebetween. A peripheral portion of the first area of the first substrate and a peripheral portion of the second substrate are attached to each other by a frame-shaped sealing part. Liquid crystal is enclosed within an inner side surrounded by the sealing part. The frame-shaped sealing part is covered by the light-shielding film provided in the second substrate. The frame-shaped sealing part and the light-shielding film define a frame area. The frame area defines an image display area within its inner side. On a surface of each substrate, which is on a side of the liquid crystal, an alignment film configured to align liquid crystals is provided.

BRIEF DESCRIPTION OF THE DRAWINGS

FIG. 3 is an enlarged partially cutaway view taken along line in FIG. 2.

FIG. 5 is an enlarged partially cutaway view taken along line V-V in FIG. 4.

DETAILED DESCRIPTION

Figure 1:
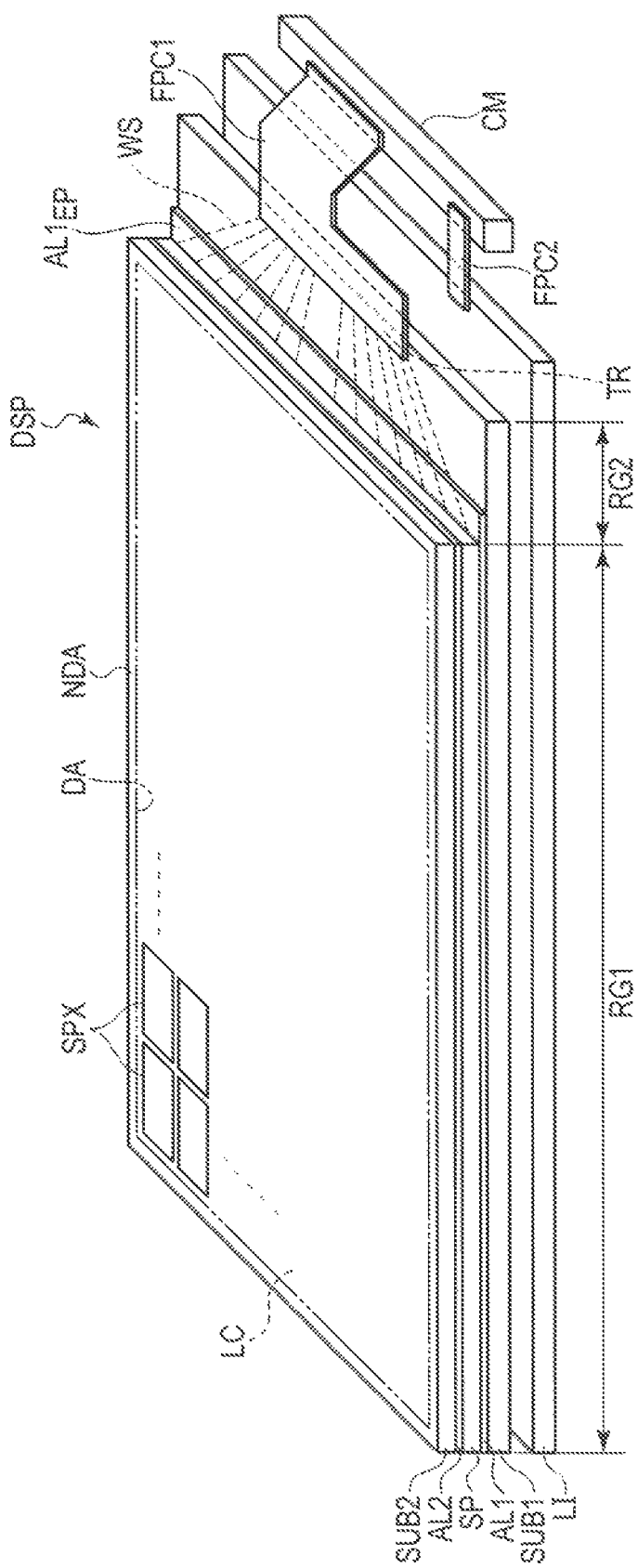
FIG. 1 is a schematic perspective view of a liquid crystal display device according to an embodiment.

In general, according to one embodiment, a liquid crystal display device comprises a first substrate including a first area and a second area, a second substrate opposing the first substrate but not opposing the second area, a sealing part which adheres the first substrate and the second substrate to each other, a liquid crystal layer located between the first substrate and the second substrate and surrounded by the sealing part, an alignment film disposed on the first substrate so as to be in contact with the liquid crystal layer and a terminal located in the second area and connected to an external circuit. In plan view, the alignment film includes an end located between the sealing part and the terminal.

The authors of the embodiments tested liquid crystal display devices having such a structure that an alignment film is provided on the entire second area except the terminal to which an external circuit or the like is connected, as described above. They have found that when the devices are used under high humidity environment for a long period time, non-uniformity in luminance occurs with time of use.

The cause of the non-uniformity in luminance was examined and it is inferred from the results that the alignment film provided on the entire second area except the terminal to which the external circuit or the like is connected, absorbs moisture in the atmosphere, and as the moisture reaches the liquid crystal layer through the alignment film, the voltage holding ratio of the moist liquid crystal layer may decrease to lower the luminance.

Under these circumstances, the authors of the embodiments have developed a liquid crystal display device which can suppress the occurrence of non-uniformity in luminance even if the alignment film is provided on the second area of the first substrate.

Some embodiments will be described hereinafter with reference to drawings. In addition, in some cases, in order to make the description clearer, the widths, thicknesses, shapes, etc., of the respective parts are schematically illustrated in the drawings and compared to the actual modes. However, the schematic illustration is merely an example, and adds no restrictions to the interpretation of the invention. In addition, in the specification and drawings, the structural elements which have functions identical or similar to the functions described in connection with preceding drawings are denoted by like reference numbers and an overlapping detailed description thereof is omitted unless otherwise necessary.

Moreover, in this specification, such expressions as "α includes A, B or C", "α includes one of A, B and C" and "α includes one selected from the group consisting of A, B and C" do not exclude such cases where α includes a plurality of combinations of any of A, B or C, unless explicitly stated. Further, these expressions do not exclude such cases where α includes some other element.

<Liquid Crystal Display Device>

Figure 2:
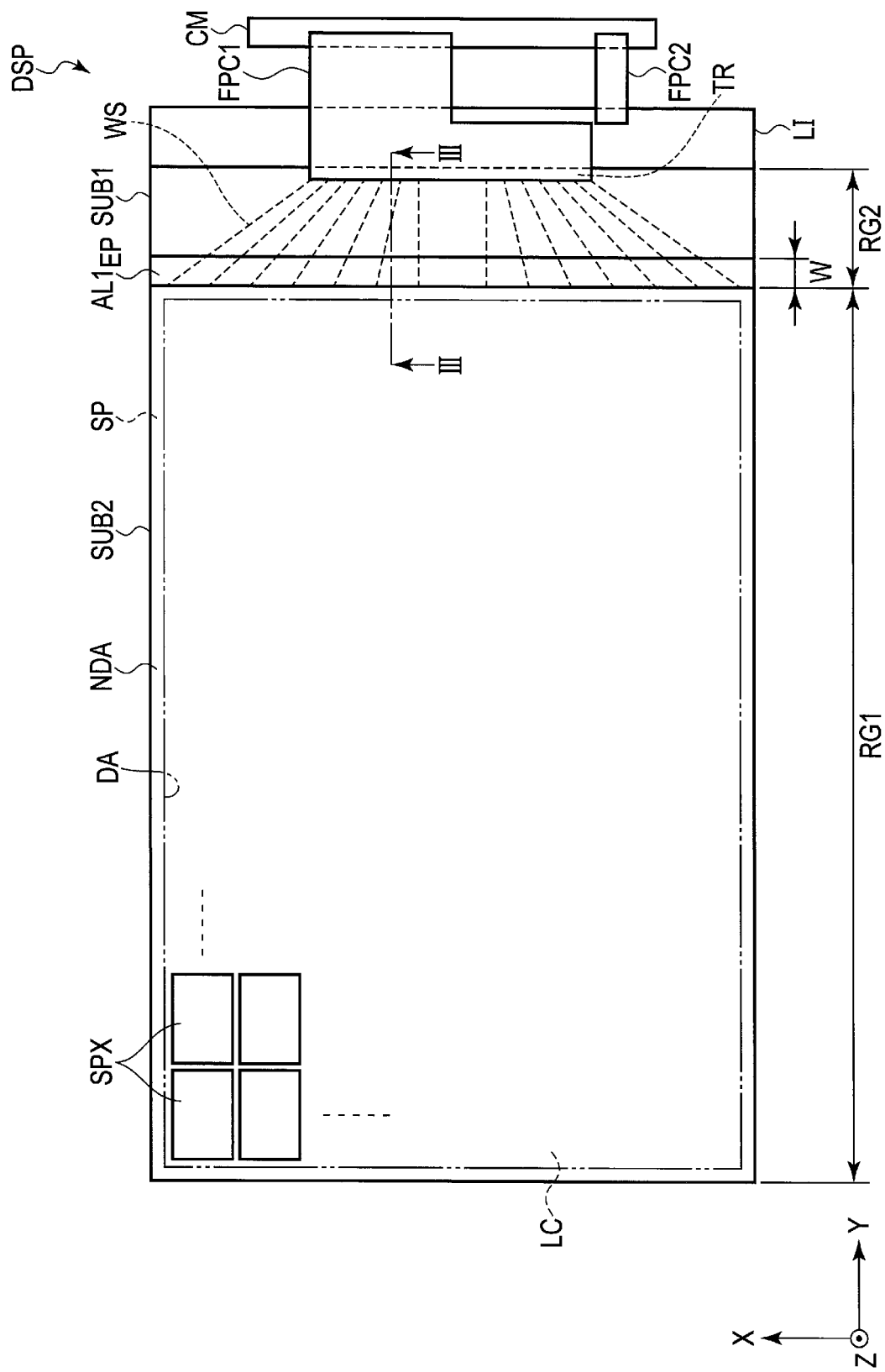
FIG. 2 is a schematic plan view of the liquid crystal display device shown in FIG. 1.

First, a liquid crystal display device DSP according to an embodiment will be described with reference to FIGS. 1, 2 and 3. FIG. 1 is a schematic perspective view of the liquid crystal display device DSP. FIG. 2 is a schematic plan view of the liquid crystal display device DSP shown in FIG. 1. FIG. 3 is an enlarged partially cutaway view taken along line in FIG. 2.

In this embodiment, a direction parallel to a short side of the liquid crystal display device DSP is defined as a first direction X, a direction parallel to a long side thereof is defined as second direction Y, and a direction perpendicular to the first direction X and the second direction Y is defined as a third direction Z. The first direction X and the second direction Y are orthogonal to each other, but may cross at an angle other than 90°.

In this embodiment, a positive direction of the third direction Z is defined as up or above and a negative direction of the third direction Z is defined as down or below. Further, viewing the liquid crystal display device DSP from above is defined as plan view. The liquid crystal display device DSP in plan view is seen in the plan view (FIG. 2).

The liquid crystal display device DSP comprises a first substrate SUB1 and a second substrate SUB2 disposed to oppose each other. The first substrate SUB1 includes a first area RG1 and a second area RG2. The second substrate SUB2 opposes the first area RG of the first substrate SUB11, but does not oppose the second area RG2 of the first substrate SUB1. In other words, the second area RG2 of the first substrate SUB1 extends to an outer side from an edge of the second substrate SUB2. A plane size of the first area RG1 of the first substrate SUB1 is the same as that of the second substrate SUB2.

There is a demand of narrowing (reducing in size) the second area RG2 as well as a frame area NDA, which will be described later in detail. A width of the second area RG2 along the second direction Y should preferably be less than 1,000 μm, for example, and more preferably, less than 800 μm.

The first substrate SUB1 and the second substrate SUB2 define a predetermined cell gap therebetween. A peripheral portion of the first area RG1 of the first substrate SUB1 and a peripheral portion of the second substrate SUB2 are attached to each other by a sealing part SP formed into a frame-like shape. In an inner side surrounded by the sealing part SP, liquid crystal is enclosed to form a liquid crystal layer LC. The frame-shaped sealing part SP, together with a light-shielding film BM, defines the frame area NDA. The frame area NDA defines an image display region DA within the inner side thereof. The image display region DA has, for example, a rectangular shape and comprises a plurality of subpixels SPX arranged in a matrix.

In the first substrate SUB1, a first alignment film AL1 to align the liquid crystals is provided so as to be in contact with the liquid crystal layer LC. The second substrate SUB2 is provided with second alignment film AL2 in contact with liquid crystal layer LC. An end portion $AL1_{EP}$ of the first alignment film AL1 extends further from the sealing part SP and is located between the sealing part SP and the terminal TR in plan view (FIG. 2). In this embodiment, the end portion $AL1_{EP}$ of the first alignment film AL1 extends outwards from the sealing part SP, but is located between the sealing part SP and the terminal TR; therefore non-uniformity in luminance of the liquid crystal display device can be suppressed.

In order to further control the non-uniformity in luminance of the liquid crystal display device, a width W (FIG. 2) of an extending portion of the end portion $AL1_{EP}$ of the first alignment film AL1 from the sealing part SP in plan view should preferably be less than 200 μm, and more preferably, less than 150 μm. Note that when the first alignment film AL1 extending from the sealing part SP to the second area RG2 is removed such that the width of the end portion $AL1_{EP}$ of the first alignment film AL1 is less than 10 μm, the adhesive strength may deteriorate as the sealing part SP near the end portion $AL1_{EP}$ of the first alignment film AL1 is affected by the removal process. Here, when the width of the end portion $AL1_{EP}$ of the first alignment film AL1 is excessively small (for example, less than 10 μm), the moisture entering from the end portion $AL1_{EP}$ may undesirably reach the liquid crystal layer LC easily via the first alignment film AL1. For this reason, the width of the end portion $AL1_{EP}$ of the first alignment film AL1 should preferably be 10 μm or greater.

In the second area RG2 of the first substrate SUB1, a plurality of wiring structures WS and terminals TR, which will be explained later in detail, are provided. Each of the wiring structures WS is electrically connected, for example, by its one end, to an electrode such as of a thin film transistor (TFT) or the like provided in the first area RG1 of the first substrate SUB11, whereas the other end is electrically connected to the terminal TR. To the terminal TR, a first flexible printed circuit FPC1 is electrically connected. Note that in the second area RG2 of the first substrate SUB1 of this embodiment, a driver IC chip is not provided because it narrows (reduces in size) the second area RG2.

The flexible printed circuit FPC1 electrically connects the first substrate SUB1 and a control module CM. In the control module CM, a second flexible printed circuit FPC2 is provided to electrically connect the control module CM and the light irradiation part LI to each other. The first and second flexible printed circuits FPC1 and FPC2 transmit drive signals of the control module CM to the first substrate SUB1 and the light irradiation portion LI. The light irradiation portion LI disposed below an opposite side to the second substrate SUB2 with respect to the first substrate SUB1 corresponds to the so-called backlight unit, which illuminates the image display area from a first substrate SUB1 side.

As shown in FIG. 3, the first substrate SUB1 comprises a first base substrate S1 and a pixel circuit layer PC. The first base substrate S1 is a light-transmissive insulating substrate, for example, an resin substrate containing polyimide, polyamide or the like, or a glass substrate.

The pixel circuit layer PC is disposed on a surface of the first base substrate S1, which is on a side of the liquid crystal layer LC. The pixel circuit layer PC includes, in the first area RG1, counter-electrodes, pixel electrodes, a planarizing film, a TFT and the like (not shown). Each of the counter-electrodes included in the pixel circuit layer PC is electrically insulated from the pixel electrodes. The pixel electrodes can be formed from, for example, a light-transmissive conductive material such as indium tin oxide (ITO), indium zinc oxide (IZO) or the like, or a light-reflective conductive material containing Ag, Al, Al alloy or the like. The counter-electrodes can be formed from, for example, a light-transmissive conductive material such as ITO or IZO. The planarizing film has a flat surface which covers the unevenness on the base portion and can be formed from, for example, an organic planarizing film such as of hard resin coat (HRC). Further, the pixel circuit layer PC includes, in the second area RG2, the wiring structure WS, the terminal TR and the like. The wiring structure WS includes three wiring layers as will be describe later and a region projecting toward the third direction Z (upwards) from the other parts of the pixel circuit layer PC.

In the second area RG2, the end portion $AL1_{EP}$ of the first alignment film AL1 gradually reduces its thickness along the second direction Y (the extending direction) on the wiring structure WS (FIG. 3). Since the thickness of the end portion $AL1_{EP}$ of the first alignment film AL1 decreases gradually, the amount of moisture absorption of the end portion $AL1_{EP}$ of the first alignment film AL1 can be suppressed. Further, the end portion $AL1_{EP}$ of the first alignment film AL1 includes a thin film portion TF whose thickness is less than that of the other portions in the second area RG2 and, for example, on the wiring structure WS. The end portion $AL1_{EP}$ of the first alignment film AL1, which includes the thin film portion TF, can also suppress the amount of moisture absorption in the thin film portion TF. Moreover, with the thin film portion TF thus formed, the removing property of the first alignment film AL1 in an ashing step, which will be described later, can be improved.

The second substrate SUB2 comprises a second base substrate S2 and a color filter CF. A thickness of the second substrate SUB2 (a total thickness of the second base substrate S2, the color filter CF, an overcoat layer OC, a second alignment film AL2 and the like) should preferably be 300 μm or less. For example, as compared to a liquid crystal display device comprising a second substrate SUB2 over 300 μm in thickness, a liquid crystal display device comprising a second substrate SUB2 having a thickness of 300 μm or less can be manufactured in such a process that the first alignment film AL1 extending to the second area RG2 of the first substrate SUB1 is removed by the ashing process or the like for a short time and the end portion $AL1_{EP}$ of the first alignment film AL1 is formed between the sealing part SP and the terminal TR; therefore chances are low that the sealing part SP deteriorates.

When the thickness of the second substrate SUB2 is set to A (μm), the width of the alignment film extending from the sealing part SP (the width of the end portion $AL1_{EP}$ (which is referred to as W in FIG. 2)) is set to B (μm) and $C=A \times B$ (μm²), C should preferably be 1,000 or greater but 25,000 or less, and more preferably, 1000 or greater but less than 15,000. When this range is satisfied, such a liquid crystal display device can be achieved that the adhesive strength of the sealing part is high and moisture hardly enters from the end portion $AL1_{EP}$ of the alignment film.

The second base substrate S2 is a light-transmissive insulating substrate, for example, an resin substrate containing polyimide, polyamide or the like, or a glass substrate. The color filter CF is disposed on a surface of the second base substrate S2, which is on a side of the liquid crystal layer LC. The color filter CF includes periodically arranged filter segments CFR, CFG and CFB of red (R), green (G) and blue (B) (displayed as subpixels SPX in FIG. 1). The above-described three color subpixels constitute one single pixel. Between the filter segments CFR, CFG and CFB and in the frame area NDA, the light-shielding film BM is provided. The light-shielding film BM is formed into a grid shape in plan view, which partitions the filter segments CFR, CFG and CFB from each other to prevent the mixing of color between adjacent filter segments. The light-shielding film BM is, for example, a black resin, a low reflective metal or the like.

The overcoat layer OC is disposed so as to cover the filter segments CFR, CFG and CFB and the light-shielding film BM. The overcoat layer OC covers the unevenness of the surface of the filter segment CFR, CFG and CFB and the light-shielding film BM to form a flat surface (planarizing film).

As described above, the sealing part SP adheres the peripheral portion of the first area RG1 of the first substrate SUB1 and the peripheral portion of the second substrate SUB2 to each other in the shape of a frame. The sealing part SP can be formed from, for example, a sealing material such as an ultraviolet-setting resin or thermosetting resin by such a method which draws continuously from a starting point to a finishing point using a dispenser or the like.

As described above, the liquid crystal layer LC is provided between the first area RG1 of the first substrate SUB1 and the second substrate SUB2 and the sealing part SP. That is, the liquid crystal layer LC is disposed between the first alignment film AL1 and the second alignment film AL2.

The liquid crystal display device DSP of such a structure is equivalent to the so-called transmissive liquid crystal display device comprising a transmissive display function to displays images by selectively transmitting light entering from the light irradiation portion LI toward the first substrate SUB1 with each subpixel SPX.

<Wiring Structure>

Figure 4:
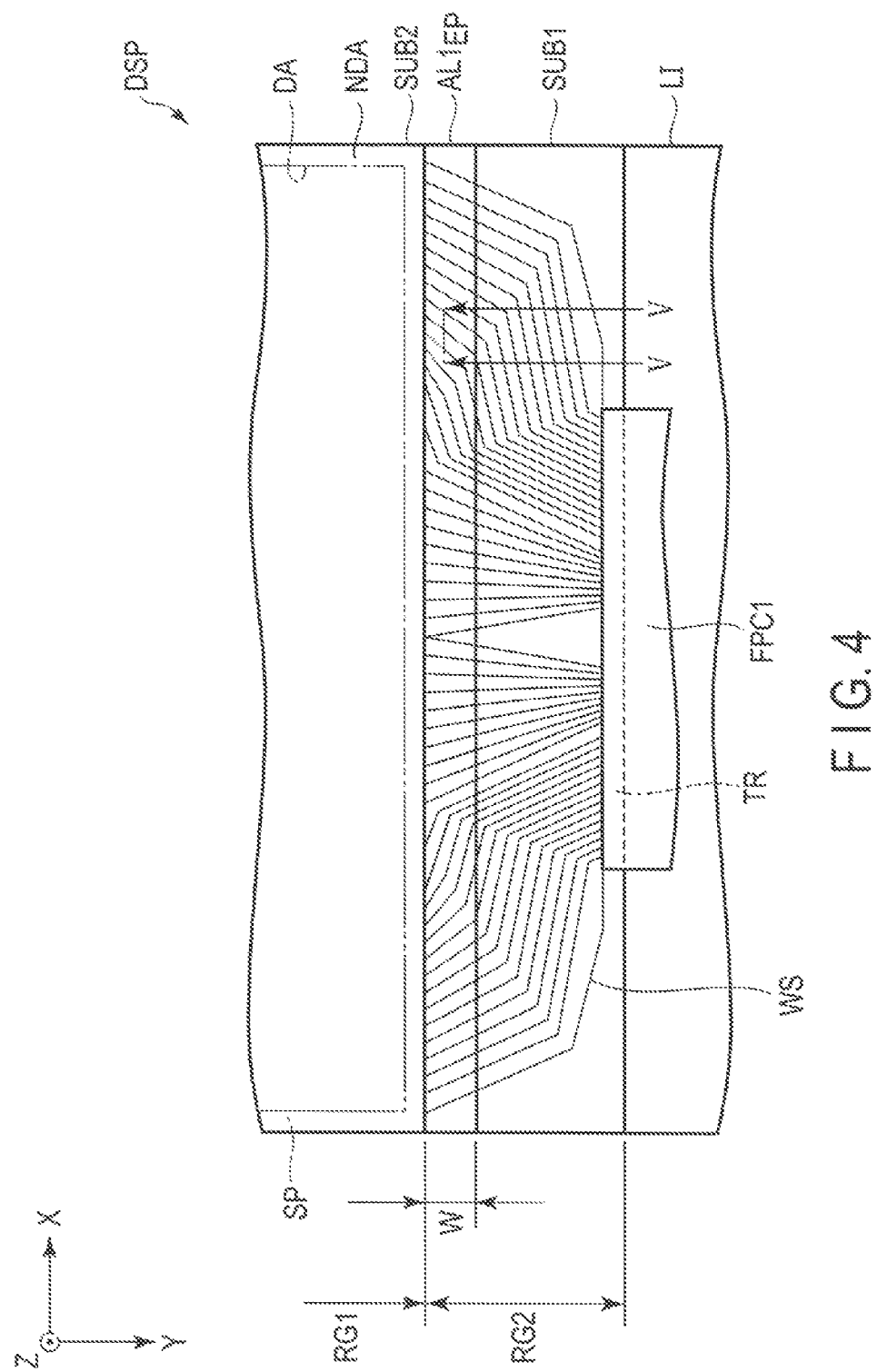
FIG. 4 is a partially enlarged schematic plan view of the liquid crystal display device shown in FIG. 2.

The wiring structures WS included in the liquid crystal display device DSP according to the embodiment will now be described with reference to FIGS. 4 and 5. FIG. 4 is a partially enlarged schematic plan view of the liquid crystal display device shown in FIG. 2, and FIG. 5 is an enlarged partially cutaway view taken along line V-V in FIG. 4.

As shown in FIG. 4, each wiring structure WS includes a portion extending a terminal TR side toward the first area RG1 while expanding in oblique directions at arbitrary angles with respect to the first direction X and the second direction Y, respectively. Some of the wiring structures WS include a portion expanding along the first direction X or a portion expanding along the second direction Y.

As shown in FIG. 5, each wiring structure WS comprises a first wiring line WL1 provided on the first base substrate S1, two second wiring lines WL2 provided on the first insulating film IL1 provided to cover the first wiring line WL1, and a third wiring line WL3 provided on the second insulating film IL2 provided to cover the second wiring lines WL2. A third insulating film IL3 is provided to cover the third wiring line WL3. The second insulating film IL2 is formed from an organic material so as to planarize the unevenness resulting from the wiring lines (for example, the first wiring line WL1 and the second wiring line WL2) and transistors. Three layers of the wiring lines (the first wiring line WL1 to the third wiring line WL3) overlap each other along the third direction Z and the third wiring line WL3 is located on the second insulating film IL2 as a planarizing film. With this structure, each of the wiring structures WS forms a convex part as shown in FIG. 3. The portion of the first alignment film AL1, which is located on the convex part, is the thin film portion TF.

Above the third insulating film IL3, the end portion $AL1_{EP}$ of the first alignment film AL1 is provided. The sealing part SP is provided on the portion equivalent to the peripheral portion of the first area RG1 of the first substrate SUB1 in the first alignment film AL1. That is, in cross sectional view, between the sealing part SP and the third wiring line WL3, the first alignment film AL1 and the third insulating film IL3 are located. The third wiring line WL3 is formed in a position very close to the sealing part SP and therefore it may be easily contaminated from the sealing part SP. However, since the first alignment film AL1 and the third insulating film IL3 function as protective films, the contamination of the third wiring line WL3 from the sealing part SP is suppressed.

The first wiring line WL1 to the third wiring line WL3 included in each wiring structure WS are each electrically connected, for example, by one end side, to respective electrodes of TFTs and the like provided in the first area RG1 of the first substrate SUB1, whereas they are each electrically connected by the other end side to the respective terminal TR.

As to the widths of the first wiring line WL1 to the third wiring line WL3 along the first direction X in each wiring structure WS, the width of the first wiring line WL1 is greatest as compared to those of the second wiring lines WL2 and the third wiring line WL3, the width of the third wiring line WL3 is greater than that of the second wiring line WL2, which is narrowest. Moreover, in each wiring structure WS, the first wiring line WL1 to the third wiring line WL3 partially or entirely superimpose one on another along the third direction Z.

In each wiring structure WS, as to thicknesses of the first wiring line WL1 to the third wiring line WL3 along the third direction Z, the thickness of the second wiring line WL2 is greatest of all, and the thickness of the third wiring line WL3 is greater than that of the first wiring line WL1, which is the thinnest.

Here, in a plurality of wiring structures WS, let us now define a distance along the first direction X between one wiring line included in one wiring structure WS and a corresponding one of an adjacent wiring structure WS, as an inter-wiring distance. Then, the inter-wiring distance of the third wiring lines WL3 is the greatest of all, and the inter-wiring distance of the first wiring line WL1 is greater than that of the second wiring line WL2, which is the least.

The first wiring line WL1 can be formed from a high-melting metal material such as molybdenum (Mo) or chromium (Cr), which can withstand the heat treatment during the formation of TFTs, for example. On the other hand, the second wiring lines WL2 and the third wiring line WL3 can be provided, for example, after the formation of TFTs, and therefore they can be formed from a low-resistance metal material such as aluminum (Al). Note that the first to third wiring lines WL1 to WL3 are not limited to a metal of a single layer, but may be of a multilayer of a plurality of metal layers or metal oxide layers such as of indium oxide. For example, usable examples of such a multilayer are titanium (Ti)/Al/Ti, Mo/Al/Mo, Mo/indium oxide, and Cr/indium oxide.

For the first insulating film IL1, for example, silicon oxide (SiO), silicon nitride (SiN) or an inorganic insulating film such as a multilayer of these can be used. The second insulating film IL2 is an insulating film which functions as a protective film for the second wiring line WL2, which includes an organic insulating film (of acryl, polyimide, polyamide or the like) to planarize unevenness formed by, for example, wiring lines and transistors. The third insulating film IL3 is an insulating film which functions as a protective film for the third wiring line WL3, and it is the uppermost surface portion of the pixel circuit layer PC except for the terminal TR to which the first flexible printed circuit FPC1 in the second area RG2 is connected. Here, there may be such cases where the first alignment film AL1 is located on the pixel circuit layer PC. Therefore, for the third insulating film IL3, an inorganic insulating film such as of SiO, SiN or a multilayer of these mentioned above, or like can be used.

FIG. 5 illustrates three wiring structures WS, in each of which, the first wiring line WL1 is disposed below the second wiring line WL2 and the third wiring line WL3, and the third wiring line WL3 is disposed above the first wiring line WL1 and the third wiring line WL2. But, in some of the wiring structures WS and in other parts of the second area RG2, for example, the first wiring lines WL1 replaces the second wiring lines WL2 or the third wiring lines WL3 and are disposed in the layer (the insulating film layer) of the second insulating film IL2 or the third insulating film IL3. That is, in some wiring structures WS, the first wiring lines WL1 to the third wiring lines WL3 electrically connect the electrodes of TFT or the like and the terminals TR to each other, provided in the first area RG1 of the first substrate SUB1, while replacing the wiring lines with other ones to allow the wiring lines to pass through different insulating film layers.

Here, in the wiring structures WS including the first wiring lines WL1 to the third wiring lines WL3 having thicknesses, widths, inter-wiring distances and the like different from each other, if the first wiring lines WL1 to the third wiring lines WL3 are provided to electrically connect the electrodes of TFT or the like and the terminals TR to each other, provided in the first area RG1 of the first substrate SUB1 without allowing these lines to pass through other insulating film layers, the following defects may arise. First, the wiring lines disposed in an insulating film layer with high resistance may increase their resistance. Further, if the resistance differs from one another in the first wiring lines WL1 to the third wiring WL3 due to the difference in resistance among the first wiring lines WL1 to the third wiring lines WL3, the speed of the drive signal reaching the electrodes may vary from one electrode to another, possibly causing display errors such as streaks on the liquid crystal display device.

Furthermore, if the wiring lines (the first wiring lines WL1 to the third wiring lines WL3) formed in different insulating film layers are superimposed one on another right above or directly under, the parasitic capacitance may greatly increase. On the other hand, if the wiring lines formed in different insulating film layers are not superimposed, a value of L/S (line & space), which indicates the width of the wiring lines WL and the inter-wiring distance between wiring lines formed in the insulating film layers, does not become the least of those of the wiring layers used, but becomes that in accordance with the greatest of those of the wiring layers used. Therefore, each wiring structure WS is widened so that it cannot be formed within the second area RG2 reduced in size.

However, the liquid crystal display device DSP of this embodiment are configured as described above. That is, in some of the wiring structures WS, the first wiring line WL1 to the third wiring line WL3 electrically connect the electrodes such as of TFT and the terminals TR to each other, provided in the first area RG1 of the first substrate SUB1 while replacing some other wiring lines to pass through different insulating film layers. With this configuration, the increase in resistance and parasitic capacitance can be suppressed as compared to the case where the wiring lines are not formed to pass through different insulating film layers.

Further, the liquid crystal display device DSP of this embodiment is configured such that the first wiring lines WL1 to the third wiring lines WL3 are, partially or entirely in each wiring line, superimposed along the third direction Z as described above. With this configuration, each wiring structure WS can be narrowed further so that it can be disposed in the second area RG2 reduced in size, as compared to the case where the wiring lines are not superimposed.

Furthermore, the width of the first wiring line WL1 is set greater than those of the second wiring line WL2 and the third wiring line WL3, and therefore the wiring resistance of the first wiring line WL1, which has high resistance, can be reduced. Moreover, the thickness of the second wiring line WL2 is set relatively greater than those of the first wiring line WL1 and the third wiring line WL3, and therefore the risk of short-circuiting between a first wiring line WL1 and a second wiring line WL2 can be reduced. Further, the inter-wiring distance of the second wiring lines WL2 is set relatively less than that of the first wiring lines WL1, and therefore the parasitic capacitance of the first wiring lines WL1 can be reduced. In addition, as to the details of the wiring structures WS, see JP 2016-200659 A.

<Material of Alignment Film>

As a material of the alignment film (the first alignment film AL1) included in the liquid crystal display device DSP configured as described above, a photolytic alignment film is preferable. The photolytic alignment film is an alignment film in which a part of its structure decomposes when irradiated with ultraviolet rays so as to be able to specify the direction of alignment of the liquid crystal molecules. The structure of a photolytic alignment film is a high polymer compound (polyimide) which contains a repeating unit represented by, for example, by the following formula (1).

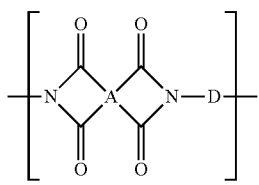
(1)

In formula (1), A represents a quadrivalent organic group and D represents a divalent organic group.

Examples of A are aliphatic cyclic compounds such as cyclobutane, cyclopentane and cyclohexane, and these compounds to which substituents are bound.

D is $Ar^0$ or $Ar^1$—Z—$Ar^2$. $Ar^0$ is an aromatic cyclic compound or an aliphatic cyclic compound. $Ar^1$ and $Ar^2$ are independently an aromatic cyclic compound or an aliphatic cyclic compound, respectively. Z is an organic group which does not contain a primary amino group or a secondary amino group. Examples of $Ar^0$, $Ar^1$ or $Ar^2$ are aromatic cyclic compounds such as phenylene, biphenylene, oxybiphenylene, biphenyleneamine, naphthalene and anthracene; aliphatic cyclic compounds such as cyclohexene and bicyclohexene, and these compounds to which a substituent is bound. Z is, for example, oxygen, nitrogen, sulfur, carbon and hydrogen, and a combination of any of two or more of these. Z does not contain an amino group other than the tertiary amino group, a hydroxyl group or a thiol group. Note that the amide bond is distinguished from the secondary amino group because it has chemical properties different from those of the secondary amino group. In other words, Z may be an organic group which forms an amide bond.

Such a photolytic alignment film (polyimide) is formed on the first substrate SUB1 by heating a precursor organic compound (the first polyamide acid-based compound) applied on the surface of the first substrate SUB1. The first polyamide acid-based compound applied on the surface of the first substrate SUB1 is a polyamide acid or polyamide acid ester represented by, for example, by the following formula (2).

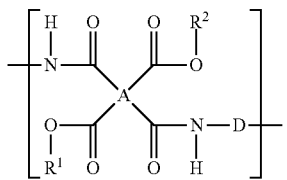
(2)

In formula (2), A and D are as defined in connection with formula (1), $R^1$ and $R^2$ are H or an alkyl chain of —$C_m H_{2m+1}$, and m is 1 or 2.

A skeleton at a terminal end of the first polyamide acid compound represented by formula (2) does not contain a primary amino group or a secondary amino group. In some examples, the skeleton of the terminal end of the first polyamide acid-based compound represented by formula (2) includes an imide skeleton, an amide skeleton, a urea skeleton, a tertiary amino group, an azo bond or a carboxyl group.

In some examples, the skeleton of the terminal end of the first polyamide acid-based compound represented by formula (2) is expressed by the following formula (3).

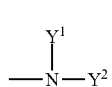
(3)

In formula (3), N is as defined in connection with formula (1); $Y^1$ is H, S or an organic group; $Y^2$ is an aliphatic group or an aromatic group, or $Y^1$ and $Y^2$ bond to each other to form a cyclic group (for example, imide).

In some examples, the skeleton of the terminal end of the first polyamide acid-based compound represented by formula (2) is expressed by the following formula (4).

—N=N—$Y^3$ (4)

In formula (4), $Y^3$ is an organic group.

In some examples, the skeleton of the terminal end of the first polyamide acid-based compound represented by formula (2) is expressed by the following formula (5)

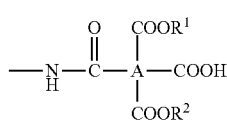
(5)

In formula (5), A is as defined in connection with formula (1), and $R^1$ and $R^2$ are as defined in connection with formula (2).

The polyamide acid, which is the first polyamide acid-based compound can be prepared by making tetracarboxylic dianhydride and diamine react by an ordinary method.

The tetracarboxylic dianhydride can be expressed by the following formula (6).

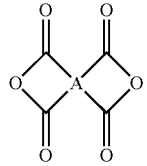
(6)

In formula (6), A is as defined in connection with formula (1).

The diamine can be expressed by the following formula (7).

$H_2N$—D—$NH_2$ (7)

In formula (7), D is as defined in connection with formula (1).

Examples of the diamine represented by formula (7) are aromatic diamine and aliphatic diamine. A typical example of the diamine represented by formula (7) is aromatic diamine, and can be expressed by the following formula (8) or (9).

(8)

(9)

In formulas (8) and (9), $Ar^0$, $Ar^1$, $Ar^2$ and Z are as defined in connection with formula (1).

The alignment film generated using the diamine represented by formula (8) has high optical aligning property, and can be used as a photolytic alignment film. The alignment film generated using the diamine represented by formula (9) does not contain a hydroxyl group or a thiol group, and therefore the influence of a hydrogen bond is low, and the film tends to have high resistance.

The polyamide acid ester can be prepared by, for example, making N,N-dimethylformamidedialkylacetal to react with the polyamide acid described above. Alternatively, the polyamide acid ester can also be made by a method disclosed in JP 2000-273172 A.

The first polyamide acid-based compound is dissolved or dispersed in an organic solvent to form a varnish for the alignment film, which is then applied on the surface of the first substrate SUB1. Examples of the organic solvent used for the varnish for alignment films are N,N-dimethylformamide, N,N-dimethylacetoamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 1,3-dimethyl-imidazolidinone, ethylamylketone, methylnonylketone, methylethylketone, methylisoamylketone, methylisopropylketone, cyclohexanone, ethylene carbonate, propylene carbonate, diglyme, and 4-hydroxy-4-methyl 2-pentanone.

In some examples, the first alignment film AL1 comprises a first layer in contact with the liquid crystal layer LC and a second layer disposed below the first layer, and the material of at least the first layer is photolytic. Such an alignment film can be formed by using a varnish for alignment films, which further contains a second polyamide acid-based compound which is polyamide acid or polyamide acid ester, in addition to the first polyamide acid-based compound described above. As described above, when the alignment film is divided into two layers and the photolytic material is concentrated in the upper layer, the degree of decomposition of the alignment film when irradiated with ultraviolet rays can be increased. Additionally, an alignment film with high decomposition degree can be easily removed in the ashing step, which will be described later.

In this case, if the second polyamide acid-based compound which has a polarity higher (greater surface energy) than that of the first polyamide acid-based compound, and the second polyamide acid-based compound are allowed to coexist, they separate into phases (phase separation). Further, since the second polyamide acid-based compound has a higher affinity with the inorganic material film such as of ITO, IZO or a silicon oxide, silicon nitride or the like, which forms the pixel electrodes of the first substrate SUB1, or the organic passivation film of an organic resin layer, the second polyamide acid-based compound is formed as a lower layer (second layer), and the first polyamide acid-based compound as an upper layer (first layer). Note that between the upper layer and the lower layer, there may be such a case where a layer in which the materials of both are mixed together is formed.

Moreover, if the polyamide acid ester and the polyamide acid coexist, the polyamide acid ester forms the first layer and the polyamide acid forms the second layer. Or if two kinds of polyamide acid coexist, with oxygen or fluoride being present in the diamine skeleton of one polyamide acid, whereas none of oxygen and fluoride being present in the diamene skeleton of the other polyamide acid, the one polyamide acid forms the second layer and the other polyamide acid forms the first layer. Moreover, even in the case where oxygen or fluoride is present in the other polyamide acid, if the amount thereof is less than that of oxygen or fluoride in the diamine skeleton of the one polyamide acid, the one polyamide acid forms the second layer and the other polyamide acid forms the first layer.

The second polyamide acid-based compound can be selected from those listed as the first polyamide acid-based compounds. The second polyamide acid-based compound can be selected from those obtained by reacting tetracarboxylic dianhydride (for example, pyromellitic dianhydride) including a benzene ring as A in formula (6) and the diamine represented by formula (7) with each other.

The first alignment film AL1 forms a polyimide film from such a material of a photolytic alignment film as described above, on a surface of the first substrate SUB1, which is on a liquid crystal layer LC side. After that, the polyimide film is irradiated with polarized ultraviolet light in a band of 254 nm to 365 nm, to impart alignment controllability thereto, and thus the polyimide film is formed. Note that when a photolytic alignment film is used for the first alignment film AL1, a part of the first alignment film AL1, which extends to the second area RG2 can be easily removed by washing with a solvent. In more detail, the first alignment film AL1 extending to the second area RG2 of the first substrate SUB1 is irradiated with non-polarized ultraviolet rays of a wavelength of 230 nm to 300 nm using a low-pressure mercury-vapor lamp, to finely decompose the skeleton of the first alignment film AL1. Then, the irradiated portion of the alignment film is immersed in an organic solvent such as acetone for washing, and the part of the first alignment film AL1, which extends to the second area RG2 can be easily removed. Further, the part of the first alignment film AL1, which extends to the second area RG2 is subjected to the ashing process to remove the part of the first alignment film AL1, which extends to the second area RG2.

The material of the second alignment film AL2 disposed on the surface of the second substrate SUB2, which is on a liquid crystal layer LC side may be a photolytic alignment film as in the case of the first alignment film AL1. The second alignment film AL2 and the first alignment film AL1 may be photolytic alignment films of the same material, or may be photolytic alignment films of different materials. The second alignment film AL2 can be formed through a publically-known method as an alignment film forming method. For example, the second alignment film AL2 can be formed by imparting alignment controllability to the polyimide film by rubbing the polyimide film on the surface with a rubbing cloth (rubbing process). The second alignment film AL2 has wider selectivity in material or alignment processing method because there is no necessity of removing a part thereof unlike the case of the first alignment film AL1.

Figure 6:
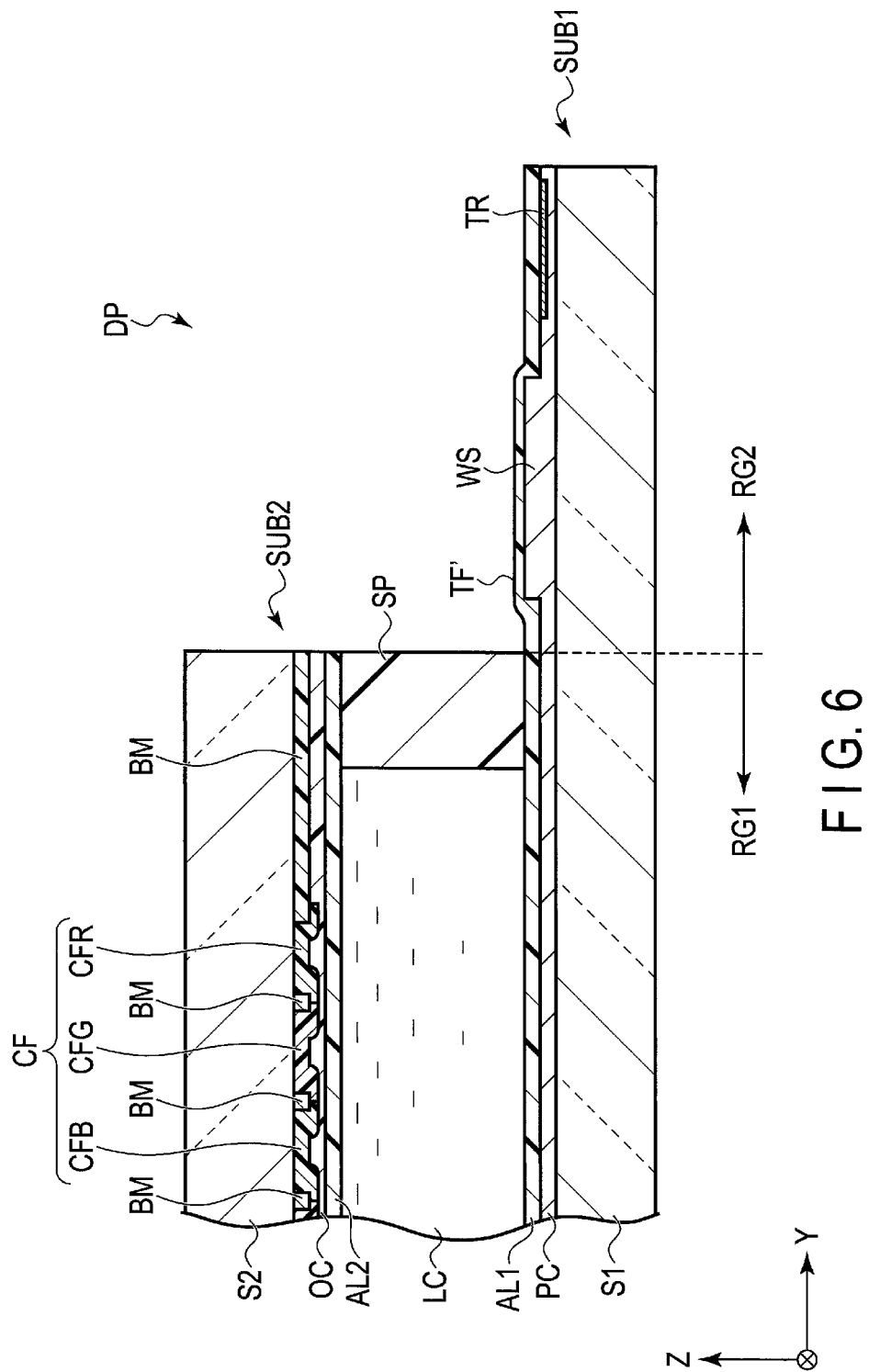
FIG. 6 is a cross-sectional view illustrating an example of the method of manufacturing the liquid crystal display device of the embodiment.

FIG. 6 is a cross-sectional view illustrating an example of the method of manufacturing the liquid crystal display device of the embodiment. The liquid crystal display device DSP shown in FIGS. 1 to 5 can be manufactured, for example, as described below.

First, the first substrate SUB1 comprising the first base substrate S1 and the pixel circuit layer PC is produced by a conventionally well-known method, and the first alignment film AL1 is provided on the entire surface of the pixel circuit layer PC. Then, the second substrate SUB2 comprising the second base substrate S2 and the color filter CF is produced by a conventionally well-known method, and the second alignment film AL2 is provided on the surface of the color filter CF. Next, the peripheral portion of the first area RG1 of the first substrate SUB1 and the peripheral portion of the second substrate SUB2 are attached to each other by the frame-shaped sealing part SP while interposing the liquid crystal layer LC between the first alignment film AL1 and the second alignment film AL2, and thus a liquid crystal display member DP as shown in FIG. 6 is produced. Note that on each wiring structure WS, the first alignment film AL1 is formed to be thinner than the other portions (thin film portion TF').

Subsequently, the first alignment film AL1 extending to the second area RG2 of the liquid crystal display member DP is subjected to the ashing process, to remove the part of the first alignment film AL1, which extends to the second area RG2, and thus the terminal TR and the third insulating film (IL3 in FIG. 5) are partially exposed. Next, the first flexible printed circuit FPC1 is electrically connected to the terminal TR, and thus the liquid crystal display device DSP is manufactured.

The embodiment provided above is described in connection with a transmissive liquid crystal display device as an example of the liquid crystal display device, but the liquid crystal display device DSP may be the so-called transreflective liquid crystal display device which also comprises a reflective display function which displays images by, for example, selectively reflecting external light entering from the outside in each subpixel PX. The transreflective liquid crystal display device may comprise, as a light source, and a front light unit on the observer side of the display panel PNL.

As an example of the liquid crystal display device, a liquid crystal display device in of a mode which mainly use a lateral electric field, such as in-plane switching (IPS) mode and a fringe field switching (FFS) mode is described above, but the embodiment can be applied also to, for example, liquid crystal display devices of other modes which mainly use a vertical electric field, such as an twisted nematic (TN) mode, optically compensated bend (OCB) mode and vertical aligned (VA) mode.

EXAMPLES

Hereafter, the embodiment will be described by examples.

Experimental Examples 1 to 6

First, six liquid crystal display members DP as shown in FIG. 6 was prepared by the above-described method of manufacturing the liquid crystal display device. The thickness of the second substrate SUB2 included in the liquid crystal display member DP in each of Examples 1 to 3 and 5 to 6 was 150 μm, and the thickness of the second substrate SUB2 included in liquid crystal display member DP of Example 4 was 250 μm.

Subsequently, the first alignment film AL1 extending to the second area RG2 of the liquid crystal display member DP was subjected to the ashing process in each of Examples 1 to 6. In Examples 1 to 6, the ashing time of the process differed from one example to another, and naturally, the width W (μm) of the end portion $AL1_{EP}$ of the first alignment film AL1 differed as well from one example to another. The common conditions of the ashing process were as follows.

<Common Conditions of Ashing Process>
Ashing device: Dry Etching Device (TE480) by Tokyo Electron, Ltd.; Pressure: 300 mTorr; Oxygen ($O_2$) gas: 40 sccm; Radion frequency (RF): 100 W; and Gap: 1.5 cm Subsequently, the first flexible printed circuit FPC1 was electrically connected to the terminal TR in the second area RG2 and thus the liquid crystal display devices DSP of Examples 1 to 6 with the structure shown in FIGS. 1 to 5 were manufactured.

The ashing time (seconds), the thickness (μm) of the second substrate SUB2, the width W (μm) of the end portion $AL1_{EP}$ of the first alignment film AL1 (μm) and a value of the product (μm$^2$) of the thickness of the second substrate SUB2 and the width W of the end portion $AL1_{EP}$ in each of Examples 1 to 6 are indicated in Table 1.

TABLE 1

|  | Ashing time (sec) | Thickness of SUB2 (μm) | Width of $AL1_{EP}$ (μm) | Thickness of SUB2 × width of $AL1_{EP}$ (μm$^2$) |
| --- | --- | --- | --- | --- |
| Example 1 | 240 | 150 | 30 | 4500 |
| Example 2 | 160 | 150 | 70 | 10500 |
| Example 3 | 120 | 150 | 100 | 15000 |
| Example 4 | 240 | 250 | 70 | 17500 |
| Example 5 | 80 | 150 | 200 | 30000 |
| Example 6 | 480 | 150 | 0 | 0 |

The liquid crystal display devices of Examples 1 to 6 thus manufactured were evaluated in terms of non-uniformity in luminance and destructive test.

[Evaluation of Non-Uniformity in Luminance]

The liquid crystal display devices of Examples 1 to 6 thus manufactured were operated to continuously display 10 different kinds of patterns in a thermostatic bath at a temperature of 70° C. and a relative humidity of 90% while switching the patterns one from another every 10 seconds. The liquid crystal displays were taken out of the thermostatic bath after a predetermined time and let to stand in a normal temperature environment of 25° C. at a relative humidity of 50% for one hour. Thereafter, the devices were operated to display a gray pattern (128th level of 256 levels of gray) on the entire display area, and were observed as to whether non-uniformity in luminance had occurred. In each case, the evaluation was made on a scale of 4 levels below. Note that white is the maximum luminance (256th level of 256 levels of gray), and black is the minimum luminance (0th level of 256 levels of gray).

A: Non-uniformity in luminance did not occur even after 500 hours.
B: Non-uniformity in luminance occurred after 500 hours.
C: Non-uniformity occurred after 384 hours.
D: Non-uniformity occurred after 250 hours.

[Destructive Test]

Moreover, five sets of liquid crystal display devices of each of Examples 1 to 6 were prepared and they were dropped in a perpendicular direction from a height of 2 m. The devices were observed whether exfoliation had occurred between the first substrate SUB1 and the second substrate SUB2 and evaluated on a scale of 4 levels below.

A: No exfoliation occurred in any of the five sets
B: Exfoliation occurred in one set
C: Exfoliation occurred in a few sets
D: Exfoliation occurred in all five sets The results of the evaluation in terms of non-uniformity in luminance and destructive test are summarized in Table 2.

TABLE 2

| | Thickness of SUB2 (μm) | Width of AL1$_{EP}$ (μm) | Non-uniformity in luminance | Destructive test |
|---|---|---|---|---|
| Example 1 | 150 | 30 | A | A |
| Example 2 | 150 | 70 | A | A |
| Example 3 | 150 | 100 | C | A |
| Example 4 | 250 | 70 | B | A |
| Example 5 | 150 | 200 | B | A |
| Example 6 | 150 | 0 | A | C |

As can be seen from results provided above, in the liquid crystal display devices of Examples 1 to 5, even if the alignment film was present in the second area of the first substrate, the generating of non-uniformity in luminance and also the degradation of the sealing part were suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    a first substrate comprising a first area and a second area;
    a second substrate opposing the first substrate and not opposing the second area;
    a sealing part which adheres the first substrate and the second substrate to each other;
    a liquid crystal layer located between the first substrate and the second substrate and surrounded by the sealing part;
    an alignment film disposed on the first substrate so as to be in contact with the liquid crystal layer, and
    a terminal located in the second area and connected to an external circuit,
    wherein the first substrate comprises an insulating substrate and a wiring structure,
    the wiring structure comprises a first wiring line, a second wiring line, a third wiring line, a first insulating film located between the first wiring line and the second wiring line, a third insulating film covering the third wiring line, and a second insulating film of an organic material, located between the second wiring line and the third wiring line,
    the wiring structure is located in the second area and is thicker than other parts in the second area,
    the alignment film is located between the liquid crystal layer and the third insulating film of an inorganic material,
    the alignment film includes a thin film portion on the wiring structure thinner than the other parts in the second area, and
    the alignment film including an end located on the wiring structure in a plan view.

2. The liquid crystal display device of claim 1, wherein the alignment film includes a portion extending from the sealing part and having a width of less than 200 μm in the plan view.

3. The liquid crystal display device of claim 1, wherein the second area has a width of less than 1,000 μm.

4. The liquid crystal display device of claim 2, wherein the second area has a width of less than 1,000 μm.

5. The liquid crystal display device of claim 1, wherein the alignment film includes an end portion a thickness of which decreases along an extending direction.

6. The liquid crystal display device of claim 4, wherein the alignment film includes an end portion a thickness of which decreases along an extending direction.

7. The liquid crystal display device of claim 1, wherein the alignment film includes a portion extending from the sealing part and having a width of 10 to 150 μm in the plan view.

8. The liquid crystal display device of claim 6, wherein the alignment film includes a portion extending from the sealing part and having a width of 10 to 150 μm in the plan view.

9. The liquid crystal display device of claim 1, wherein the second substrate has a thickness of 300 μm or less.

10. The liquid crystal display device of claim 1, wherein when a thickness of the second substrate is expressed as A (μm), a width of a portion of the alignment film, which extends from the sealing part is expressed as B (μm) and C=A×B (μm$^2$), C is 1,000 or greater but 25,000 or less.

11. The liquid crystal display device of claim 1, wherein the alignment film includes a photolytic alignment film.

12. The liquid crystal display device of claim 1, wherein the alignment film comprises a first layer in contact with the liquid crystal layer and a second layer disposed below the first layer, and at least the first layer is formed from a photolytic material.

* * * * *